May 4, 1948.　　　　L. H. MOOMAW　　　　2,440,966
VENTILATION SYSTEM FOR MOTION PICTURE PROJECTORS
Filed Oct. 17, 1946　　　2 Sheets-Sheet 1
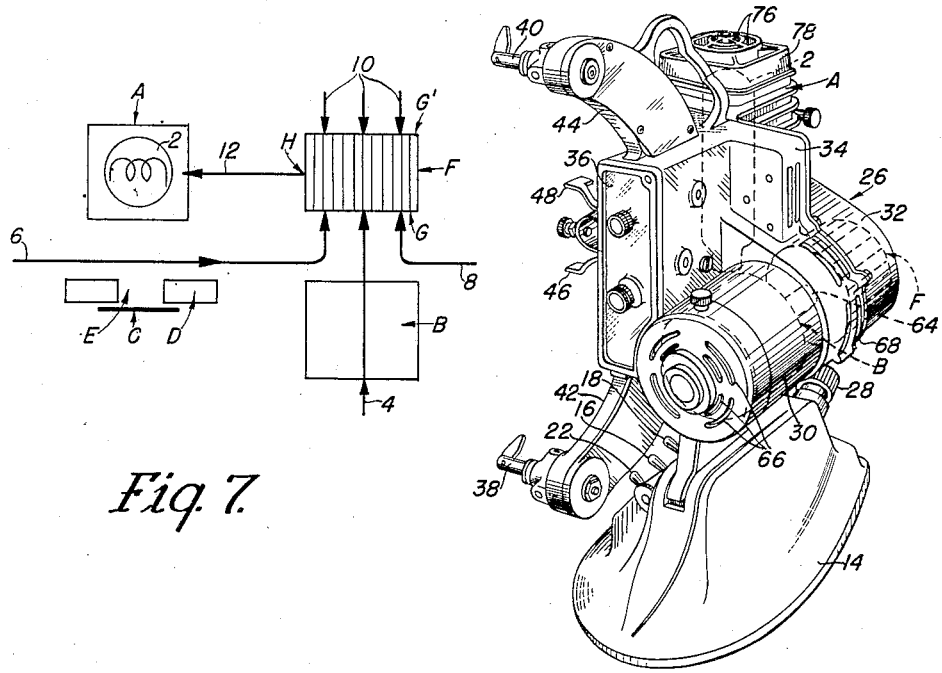
Fig. 7.
Fig. 1.
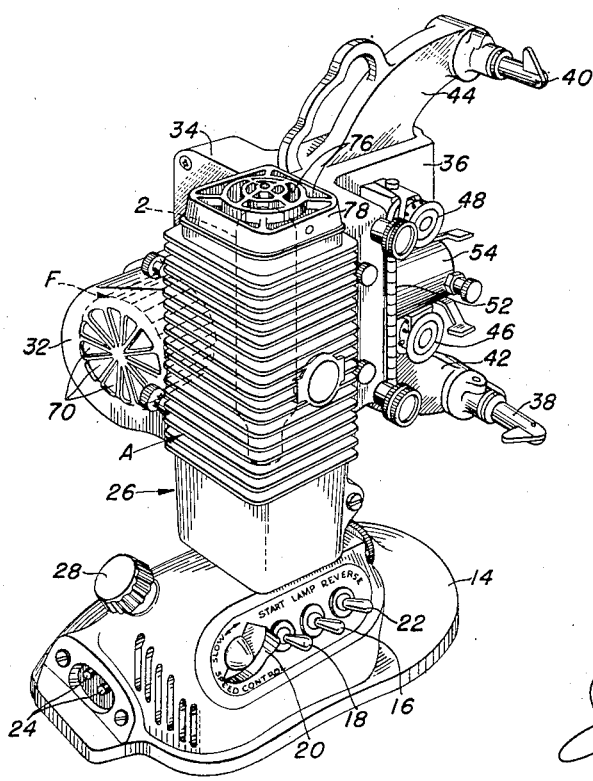
Fig. 2.
INVENTOR.
LEWIS H. MOOMAW
BY James & Franklin May 4, 1948. L. H. MOOMAW 2,440,966
VENTILATION SYSTEM FOR MOTION PICTURE PROJECTORS
Filed Oct. 17, 1946 2 Sheets-Sheet 2

INVENTOR.
LEWIS H. MOOMAW

Patented May 4, 1948

2,440,966

UNITED STATES PATENT OFFICE 2,440,966

VENTILATION SYSTEM FOR MOTION-PICTURE PROJECTORS

Lewis H. Moomaw, Great Neck, N. Y., assignor to De Jur-Amsco Corporation, Long Island City, N. Y., a corporation of New York Application October 17, 1946, Serial No. 703,805

9 Claims. (Cl. 88—17)

The present invention relates to a motion picture projector and particularly to a ventilation system therefor.

The degree and clarity of enlargement coincident with projection of motion picture film images are dependent upon many factors, one of which is the amount of light available in the projector. Bulbs of sufficient illumination power may always be used, but incandescent bulbs, when they produce light, also produce heat. Bulbs of wattage sufficient for efficient and adequate projection produce so much heat that a cooling system is necessary. The importance of this factor in projectors of the type used in motion picture houses is very great since the lamps used are of exceedingly large size. However, the solution is not critical, since the projectors may be made large enough and the cooling systems therefor may be made suitable for sufficiently heavy duty without making the projector of a size prohibitive for such use. In the case of motion picture projectors for home use, however, and particularly in the case of such projectors adapted to receive small film, for example 8 millimeter, the solution of the problem is much more difficult, since size, power consumption, and noisiness of operation are all critical factors.

While the heat produced in a projector by the light source affects all of the working parts, and particularly the moving parts thereof, its major deleterious effect is exerted on the motion picture film itself. By the very nature of the projection, each picture on the film must be exposed to a substantial part of the full force of the light from the bulb while it is stationary with respect thereto for a short period of time. Since the film is essentially delicate, excessive exposure to heat will cause it to deteriorate, scorch, and even, in the case of non-chemically treated film, burst into flames.

Consequently, the factor which in the past has largely limited the illumination power of the bulb employed in home motion projectors has been the inability of the film to withstand the heat generated by the lamp.

It is standard practice to employ a forced-draft cooling system in a motion picture projector whereby relatively cool air is drawn from the atmosphere, passed over the light bulb, cooling the same, and thence returned to the atmosphere. While such a simple system ameliorates to some extent the problems above described, it does so only to a limited degree. More complicated and efficient systems must be devised.

It is, consequently, a prime object of the present invention to provide a novel ventilation system for a motion picture projector which system is so efficient as to permit the use of light bulbs of higher wattage, and consequent greater illuminative power, than has been possible heretofore.

It is another object of the present invention to provide such a ventilation system which simultaneously and efficiently cools both the light bulb and the driving means for the projector and ventilation system.

It is yet another object of the present invention to devise a ventilation system which provides a maximum cooling effect at those parts of the projector most vulnerable to heat, to wit, the parts where the film is exposed to the full force of the lamp.

It is yet another object of the present invention to provide such a cooling system which performs the additional functions of improving the clarity of reproduction by keeping the path of light from the bulb to the film free of foreign matter and also causing the film to lie flat against its guiding means to improve the evenness of focusing of the resultant image.

To the accomplishment of the foregoing objects and such other objects as may hereinafter appear, my present invention relates to the ventilation system for a motion picture projector as sought to be defined in the appended claims and as described in the following specification, and in the drawings attached hereto, in which:

Fig. 1 is a front perspective view of a projector, with the fan and the light bulb shown in phantom;

Fig. 2 is a rear perspective view of the same projector;

Fig. 7 is a schematic flow diagram of the ventilation system of the present invention.

Figure 3:
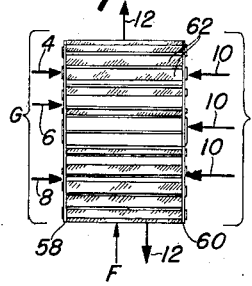
Fig. 3 is a side view of the fan employed.

The primary source of heat in a motion picture projector is the light source, usually an electric lamp 2 mounted in a lamp housing A. The secondary source of heat in a projector is the motor B which provides the motive power for the projector.

The motion picture film C, that part of the projector most susceptible to heat, is exposed to the strongest heat effects during the time that it passes over an aperture plate D containing a light aperture E through which light passes from the light bulb 2 to the film C. The aperture plate D is so positioned in the projector as to be exposed substantially continuously to the light from the light bulb 2 and since it absorbs much of the light from the lamp 2 other than that which passes through the aperture E, the aperture plate D tends to become quite warm and tends to transfer its heat to the film C. Hence cooling of the aperture plate D is of great importance.

In addition, it is of extreme importance that the aperture be kept free of foreign matter, since any such foreign matter would directly interfere with and cut off the light used for projection purposes and would be projected in greatly magnified size onto the screen. It will also be apparent that it is essential for clarity of focusing that the film C lie absolutely flat against the aperture E.

It is, therefore, necessary that an efficient ventilation system cool the motor B and the lamp 2, the minor and major heat sources respectively. It is also exceedingly desirable that the aperture plate D be cooled. The amount of cooling necessary for the motor B and the aperture plate D is considerably less than that necessary in the lamp housing A to cool the lamp 2. Consequently, lesser amounts of air are needed for the first two functions than for the last.

In order to achieve uniform cooling of the entire projector, the ventilation system of my invention (shown schematically in Fig. 7) comprises a fan F with air inlet G and air outlet H in conjunction with means to guide one body of coolant air (arrow 4) over the motor B and to the fan inlet G, means to guide another body of coolant air (arrow 6) from the atmosphere past the aperture plate D to fan inlet G, and means to guide air from the fan outlet H to the lamp housing A in order to cool the lamp (arrow 12).

Since, as has been stated, more coolant air is required for the lamp 2 than for the motor B or the aperture plate D, a third body of air (arrow 8) taken directly from the atmosphere may be guided to the fan inlet G in addition to the bodies of air represented by arrows 4 and 6.

As a further but very important modification, the fan F may be so constructed as to have two air inlets G, G' axially disposed with respect to said fan, the air inlet G' being adapted to draw fresh cool air (arrow 10) into the fan and the air inlet G being adapted to draw into the fan the bodies of air 4 and 6 which have previously cooled the motor B and the aperture plate D, respectively, and also, optionally, the air 8. The air thus drawn into the fan through inlets G, G' is centrifugally forced out therefrom in a direction perpendicular to the axis of the fan as shown by arrow 12 of Figs. 3 and 7, and is then directed by suitable means to the lamp housing A. A fan constructed to perform in this fashion materially increases the amount of air and materially decreases the temperature of the air which is directed to the lamp housing A, thus achieving maximum cooling of the lamp 2, the primary source of heat in the projector. In view of the fact that the bulk of the coolant air for the lamp 2 comes directly from the atmosphere to the fan F (arrows 8 and 10) and is directed from the fan directly to the lamp housing A (arrow 12), that air is subjected to a minimum of frictional effects which would serve to raise its temperature, performs substantially no cooling other than cooling of the bulb, thus similarly keeping its temperature down, and places a somewhat smaller load on the motor B which must drive the fan F, thus reducing the heat evolved in the course of projection.

In order for the air to cool the aperture plate D the air need merely pass around it. However, in order to perform the additional functions of maintaining the aperture E free of foreign matter and maintaining the film C pressed closely thereagainst, it is essential that the means which guides coolant air past the aperture plate D to the fan inlet G additionally guides said air past the aperture E over the inner surface of the aperture plate D. The air so guided will, as it passes over the orifice E, exert a suction effect thereon which will act to draw any foreign matter which may be in the orifice E out therefrom and will also act to draw the film C flat against the aperture plate D as it passes over the light aperture E.

Having thus described the generic principles involved in my novel ventilation system, I shall now describe a portable home motion picture projector embodying these principles in a very compact and efficient structure. The drawings and the description relate specifically to a projector of my invention adapted to receive 8 millimeter film and hence of comparatively small size, but the principles above set forth may, of course, be employed in movie projectors of other sizes, both portable and non-portable, without departing from the spirit of my invention.

My projector comprises a base 14 in which is housed the various electrical control circuits for the projector, those circuits comprising an illumination circuit for the lamp 2 controlled by switch 16, a start and stop circuit for the motor B controlled by switch 18, a rheostatic circuit for control of motor speed controlled by rotary switch 20 and a reversing switch for the motor controlled by toggle switch 22. Electrical connection is made to these circuits by means of contact pins 24. The projector housing proper, generally designated as 26, is mounted in the base 14 in such a manner as to be tiltable with respect thereto so as to control the position of the projected image, the knob 28 on the base 14 controlling the tilt.

The housing 26 comprises a motor housing 30 in which an electric motor B is supported, a fan housing 32 in which is disposed fan F, a lamp housing A in which is disposed lamp 2, a projection machinery housing 34, a gear box housing 36, a pair of reel shafts 38 and 40 rotatably mounted at the extremities of reel arms 42 and 44, conventional sprocket wheel assemblies 46 and 48 for guiding the film, aperture plate D for restricting the light from the bulb to an area equivalent to one frame of the motion picture film and a gate 50 hingedly attached thereto by piano hinge 52 and carrying a lens assembly 54 and spring-loaded pressure plate 56 for maintaining the film C in contact with the aperture plate D for properly directing and focusing the projected image. All of the above elements may be, except as hereinafter specifically described, of conventional construction insofar as this invention is concerned.

Figure 4:
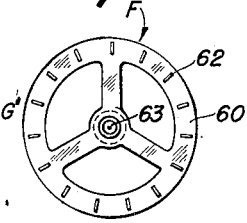
Fig. 4 is an end view thereof.

The ventilation system of my invention resides in the particular arrangements and adaptations of the above-mentioned parts to achieve the advantageous results described above. In achieving those results, the fan F, of the general type illustrated in detail in Figs. 3 and 4, may be employed. This fan F comprises a pair of spaced substantially annular end plates 58 and 60 between which and fastened to which are a plurality of fan blades 62 substantially radially disposed so that when said fan F is rotated about its axis, air in the interior thereof is centrifugally forced out therefrom in a substantial radial direction, as indicated by the arrows 12. The lack of air in the central portion of the fan F created by this action permits atmospheric pressure to force air into the middle of said fan F from both of the axial directions thereof, as indicated by the arrows 4, 6, 8 and 10.

The end plates 58 and 60 define, at the axis of the fan F, a shaft-receiving section 63 into which projects the drive shaft 64 of the electric motor B supported in the motor housing 30. The shaft 64 and the fan F are suitably connected, as by keying, so that the motor B may drive the fan F in rotation.

It is thus apparent that as here illustrated the motor B is mounted in its housing 30 in axial alignment with the fan F, but it should be understood that other arrangements are possible so long as an air path is provided over the motor B to the fan F. At the end of the motor housing 30 opposite from the fan F are a plurality of air inlet passages 66. When the switch 18 is thrown to the start position, the motor B will rotate causing the fan F to rotate, thus forcing air radially out from its interior. The fan F therefore sucks air in from its axial directions G, G', and some of the air which acts to fill the vacuum created by the fan action enters the housing 26 through the air inlet passages 66 (arrow 4), passes through the motor housing 30 and over the motor B cooling the same, and then enters the fan F via fan inlet G.

In the housing 26 directly adjacent to fan inlet G there may be a series of air inlet orifices 68, through which room air enters (arrow 8) directly, mingling with the air represented by arrow 4 and passing into the fan F. Since this air enters the fan F without passing through lengthy and restricted, and hence frictional, passages, it enters in large quantities, at low temperature, and without placing excessive load on the fan F.

At the end of the fan housing 32 opposite from the motor B are another series of air inlet openings 70. As the fan rotates, the air which enters the fan via fan inlet G' comes via these openings 70 (see arrows 10) and mingles in the fan F with the air which has entered via fan inlet G. The comments in the preceding paragraph relative to the air of arrow 8 apply equally to the air of arrows 10.

Figure 5:
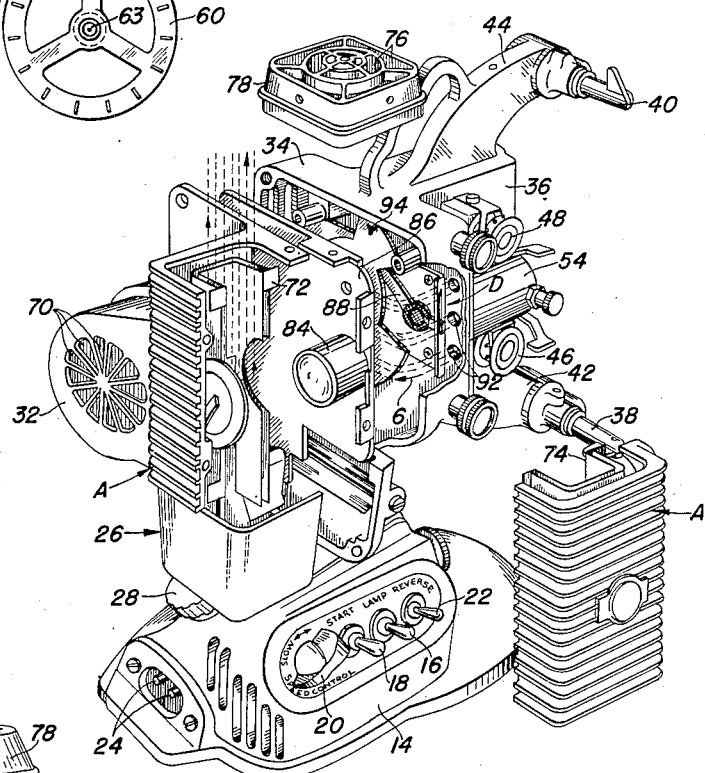
Fig. 5 is a perspective view similar to Fig. 2 with certain of the projector housing parts in exploded position.

The housing 26 between the fan housing 32 and the lamp housing A defines one or more air passages such that the air forced out from the fan F (arrow 12) is directed to the base of the lamp 2. Heat-resistant plates 72 and 74 in the lamp housing A (see Fig. 5) then guide air up over the bulb 2, cooling the same, and out through air outlet orifices 76 in the top 78 of the lamp housing A.

By the structure as thus far described, it will be apparent that by connecting the motor B to the fan F so that an air path is provided over the motor B and to the fan F, by providing air inlet orifices 66 and/or 68 and/or 70 in the housing 26, the former in the end of the motor housing 30 opposite to the fan F and the latter directly adjacent to the fan F and by providing an air passage from the fan F to the lamp housing A, a very efficient ventilating system results whereby the drive motor may be cooled and the air coolant therefor, before being employed to cool the lamp 2, the major source of heat in the projector, is first mixed with fresh cool air entering through air inlet openings 68 and/or 70 thus reducing its temperature and augmenting the quantity of air coolant available for cooling the lamp 2.

Figure 6:
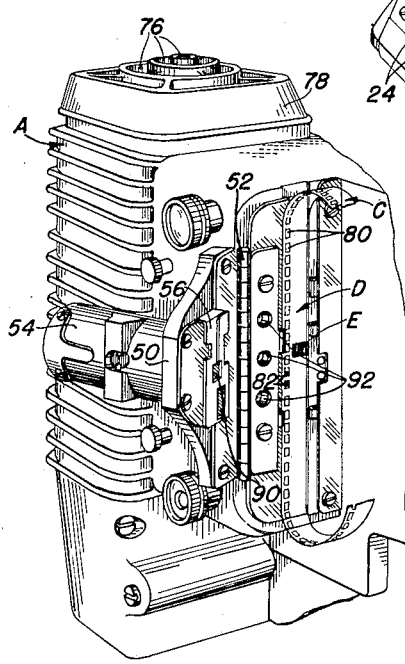
Fig. 6 is a detail perspective view of the aperture plate and hinged aperture gate of the projector.

During projection, the film C (see Fig. 6), provided with sprocket holes 80 is adapted to move over the aperture plate D and past the light aperture E therein, said motion being actuated by movable claws 82 engaging with the sprocket holes 80 in conventional manner. The light from the lamp 2 passes through condensing lens 84 mounted on baffle plate 86, through the light aperture E in the light aperture plate D (the inside of which is obscured in Fig. 5 by a fire shutter 88 which during moving projection will move up to clear the aperture E in conventional manner) and through the film C, the registering aperture 90 in the pressure plate 56, and the lens assembly 54 to the projection screen.

It will, as has been above explained, be seen to be exceedingly desirable for a ventilation system to effect direct cooling of the aperture plate D, thus protecting the film, that part of the projector assembly most susceptible to heat, at the point where it is exposed to the greatest heat, and simultaneously effecting a cleansing of the aperture E.

This may be accomplished by providing a plurality of air inlet orifices 92 in the aperture plate D adjacent to the aperture E and on the side thereof opposite from the fan F. The baffle plate 86 prevents air which enters the housing via the air inlet orifices 92 (arrow 6) from going directly to the lamp 2. The air is instead deflected (see the dotted lines of Fig. 5) and caused to pass over the inner side of the aperture plate D and the aperture E, then over the projection machinery, generally designated as 94, and then to the fan F into which it is drawn through fan inlet G along with air (arrow 4) that has entered through air inlet orifices 66 and which has passed over the motor, and optionally along the air (arrow 8) that has entered the housing 26 through air inlet orifices 68.

The air represented by arrow 6 performs a number of functions:

1. Its primary function is to directly cool the aperture E, thus keeping the temperature of the film C at a minimum.

2. In passing over the inner side of the aperture E, it tends to draw out of the aperture E any foreign matter which might have been lodged therein, thus ensuring a clean aperture.

3. By virtue of the same suction which keeps the aperture E clean, the film C is drawn tightly thereagainst, thus ensuring clarity of focusing.

4. The air also passes over the projection machinery 94 cooling the same.

By employing the ventilation system of my invention in the projector as above described, I have found it possible to employ light bulbs of 750 watts and even 1,000 watts in a small 8 millimeter home motion picture projector, whereas the employment of conventional ventilation systems in a projector of that type would not permit the use of lamps of that power. Since the main disadvantage of 8 millimeter film is its small size, and since the amount of magnification in projection is determined in part by the intensity of the light source available, my ventilation system by permitting the use of a light bulb of increased intensity, permits greater enlargement and thus considerably increases the desirability of projectors for small size film.

It will be apparent that many changes may be made in the specific design of a ventilation system for a movie projector without departing from the spirit of the invention as defined in the following claims.

I claim:

1. In a motion picture film projector comprising a lamp housing, a fan having an air inlet and an air outlet, a motor for said projector, and a light aperture plate having an aperture past which the film is adapted to slide, a ventilated system comprising means to guide coolant air through said motor to said fan inlet, means to guide coolant air past said aperture to said fan inlet only over the inner surface of said aperture plate so as to suck the film close thereto, and means to guide air from said fan outlet to said lamp housing, whereby said motor and aperture plate are cooled and said lamp housing is cooled by the coolant from said motor and said aperture plate mixed with air from the atmosphere.

2. In a motion picture film projector comprising a lamp housing, a fan having an air inlet and an air outlet, a motor for said projector, and a light aperture plate having an aperture past which the film is adapted to slide, a ventilation system comprising means to guide coolant air through said motor to said fan inlet, means to guide coolant air past said aperture only over the inner surface of said aperture plate to said fan inlet so as to suck said film close to said aperture, said inlet additionally communicating with the atmosphere, and means to guide air from said fan outlet to said lamp housing, whereby said motor and aperture plate are cooled and said lamp housing is cooled by the coolant from said motor and said aperture plate mixed with air from the atmosphere.

3. In a motion picture film projector comprising a lamp housing, a fan having an air inlet and an air outlet, and a light aperture plate over which the film is adapted to slide and having a light aperture, a ventilation system comprising means to guide coolant air past said light aperture only over the inner surface of said aperture plate to said fan inlet so as to suck said film close thereto, and means to guide air from said fan outlet to said lamp housing, whereby said aperture plate and said lamp housing are cooled.

4. In a motion picture film projector comprising a lamp housing, a fan having two air inlets axially disposed with respect thereto and an air outlet, a motor for said projector, and a light aperture plate having a light aperture, a ventilation system comprising means to guide coolant air through said motor to one of said fan inlets, means to guide coolant air past said light aperture only over the inner surface of said aperture plate to the same fan inlet, said other fan inlet communicating directly with the atmosphere, and means to guide air from said fan outlet to said lamp housing, whereby said motor and said aperture plate are cooled and the air coolants therefor are mixed with air from the atmosphere, the resultant air mixture cooling the lamp housing, and whereby the flow of air past said light aperture cools said aperture plate, keeps said aperture free of foreign matter, and maintains the film flat thereagainst.

5. In a motion picture film projector, a ventilation system comprising a projector housing, a motor driven fan mounted therein, a light aperture plate across which film is slidable mounted therein and containing an aperture through which light passes for projection purposes, and structure in said housing to permit air to enter said projector on the side of said aperture opposite from said fan and to guide said air across said aperture only on the inside of said aperture plate, whereby the flow of air past said light aperture cools said aperture plate, keeps said aperture free of foreign matter, and maintains the film flat thereagainst.

6. In a motion picture film projector, a ventilation system comprising a projector housing, a motor driven fan mounted therein, a light aperture plate mounted in said projector housing and containing an aperture through which light passes for projection purposes and also containing air intake orifices located adjacent to said aperture and on the opposite side thereof from said fan, said housing providing ventilation passages to guide air which enters said projector through said air intake orifices across said aperture only on the inside of said aperture plate whereby the flow of air past said light aperture cools said aperture plate, keeps said aperture free of foreign matter, and maintains the film flat thereagainst.

7. In a motion picture film projector, a ventilation system comprising a projector housing, a lamp housing mounted therein, a motor and a fan driven thereby mounted in said projector housing, air inlet openings in said projector housing on the side of the motor opposite from said fan, air inlet openings in said projector housing on the side of said fan opposite from the motor, a light aperture plate mounted in said projector housing and containing an aperture from which light passes for projection purposes and past which the film is adapted to slide and also containing air intake orifices located adjacent to said aperture and only on the opposite side thereof from said fan, said projector housing providing ventilating paths to guide one body of air which enters said projector housing through the openings on the side of the motor opposite to said fan, over said motor cooling the same, and another body of air, which enters said projector housing through the orifices adjacent to the aperture, across said light aperture only on the inside of said aperture plate, whereby said aperture plate is cooled, and a third body of air, which enters through the openings on the side of the fan opposite to said motor, to mix with the first two bodies of air before the resultant air mixture passes to the lamp housing for cooling purposes.

8. A ventilation system for a motion picture film projector comprising a projector housing, a baffle plate mounted therein, a fan in said housing on one side of said baffle plate, an air passage in said baffle plate, a light aperture plate in said housing on the other side of said baffle plate, said aperture plate containing an aperture through which light passes for projection purposes and past which the film is adapted to slide and also containing air intake orifices located adjacent to said aperture and on the opposite side thereof from said fan, said housing thereby providing a ventilation path whereby air may enter said housing through said orifices in the aperture plate and then pass across said aperture only on the inside of said plate and through said baffle plate into said fan, cooling said aperture, keeping it free of foreign matter, and maintaining the motion picture film flat thereagainst.

9. A ventilation system for a motion picture film projector comprising a projector housing, a baffle plate mounted therein, a fan in said housing on one side of said baffle plate, a driving motor for said fan on the other side thereof, an air passage in said baffle plate between said fan and said motor, a light aperture plate in said housing on the motor side of said baffle plate and containing an aperture through which light passes for projection purposes and past which the film is adapted to slide and also containing air intake orifices located adjacent to said aperture and on the opposite side thereof from said motor, air inlet openings in said housing on the side of the motor opposite from said fan, air inlet openings in said housing on the side of the fan opposite from the motor, a lamp housing in said projector housing on the fan side of said baffle plate, said projector housing providing an air path between said fan and said lamp housing whereby a body of air may enter said projector housing and pass over said motor cooling the same, another body of air may enter said projector housing through the orifices in said aperture plate and then, deflected by the baffle plate, pass across said aperture only on the inside of said plate, and both of the above mentioned bodies of air may be mixed with a third body of air which may enter said projector housing via the air inlet openings in said housing on the side of said fan opposite from the motor, the resultant air mixture then passing to the lamp housing.

LEWIS H. MOOMAW.

REFERENCES CITED

The following references are of record in the file of this patent:

UNITED STATES PATENTS

| Number | Name | Date |
|---|---|---|
| 1,587,955 | Howell | June 8, 1926 |
| 1,891,683 | Morsbach | Dec. 20, 1932 |
| 1,921,214 | Carpenter | Aug. 8, 1933 |
| 1,944,029 | Foster | Jan. 16, 1934 |
| 2,135,500 | Foster | Nov. 8, 1938 |
| 2,186,618 | Philips | Jan. 9, 1940 |
| 2,194,585 | Brenkert | Sept. 2, 1920 |

FOREIGN PATENTS

| Number | Country | Date |
|---|---|---|
| 379,175 | Great Britain | Aug. 25, 1932 |
| 510,255 | France | Sept. 2, 1920 |